(12) United States Patent
Jefferies et al.

(10) Patent No.: US 9,975,443 B2
(45) Date of Patent: May 22, 2018

(54) ELECTRIC VEHICLE CHARGING STATION LOCKING CABLE REEL

(71) Applicant: SCHNEIDER ELECTRIC USA, INC., Schaumburg, IL (US)

(72) Inventors: Kevin M. Jefferies, Raleigh, NC (US); Benjamin W. Edwards, Rolesville, NC (US); Matthew L. White, Raleigh, NC (US); Konstantin A. Filippenko, Raleigh, NC (US); Richard K. Weiler, Raleigh, NC (US)

(73) Assignee: Schneider Electric USA, Inc., Andover, MA (US)

( * ) Notice: Subject to any disclaimer, the term of this patent is extended or adjusted under 35 U.S.C. 154(b) by 326 days.

(21) Appl. No.: 14/898,885

(22) PCT Filed: Jun. 24, 2013

(86) PCT No.: PCT/US2013/047299
§ 371 (c)(1),
(2) Date: Dec. 16, 2015

(87) PCT Pub. No.: WO2014/209261
PCT Pub. Date: Dec. 31, 2014

(65) Prior Publication Data
US 2016/0121747 A1 May 5, 2016

(51) Int. Cl.
*B60L 11/18* (2006.01)
*H01H 3/16* (2006.01)
(Continued)

(52) U.S. Cl.
CPC ....... *B60L 11/1825* (2013.01); *B60L 11/1816* (2013.01); *B60L 11/1818* (2013.01);
(Continued)

(58) Field of Classification Search
CPC ............ H01R 2107/00; H01R 13/6581; H01R 13/5202; H01R 13/6658; H01R 13/72;
(Continued)

(56) References Cited

U.S. PATENT DOCUMENTS 3,180,963 A 4/1965 Hales et al.
4,284,180 A 8/1981 Masters
(Continued)

FOREIGN PATENT DOCUMENTS

EP 1551086 7/2005

OTHER PUBLICATIONS

GE WattStation Pedestal EVSE Charger, Operation and Maintenance [online], GE Energy, 2012 [retrieved on Oct. 9, 2013], Retrieved from the Internet<URL: http://www.geindustrial.com/publibrary/checkout/DEH-41580A?TNR=Installation%20and%20InstructionIDEH-41580A|generic>, 60pp.
(Continued)

*Primary Examiner* — Truc Nguyen
(74) *Attorney, Agent, or Firm* — Locke Lord LLP (57) ABSTRACT

A cable reel assembly in an electric vehicle supply equipment (EVSE) having a reel around which a cable is coiled. A shaft supporting the reel bears discs that rotate with the reel, and calipers coupled to the discs stop them and the reel from rotating. The power L1 and L2 conductors in the cable are electrically connected to the discs, and the calipers are electrically connected to the power source for the EVSE so that the calipers provide mechanical and electrical connection when actuated. Optionally, slip rings coupled to the shaft are connected to the control pilot and proximity signal conductors in the cable. Thus, during cable re traction, the control pilot and proximity signals are still provided to the EVSE, but the power conductors are decoupled from the
(Continued)

power source. Only when the calipers are actuated to brake the discs is current flow permitted.

17 Claims, 4 Drawing Sheets (51) Int. Cl.
*H02G 3/04* (2006.01)
*H02G 11/02* (2006.01)

(52) U.S. Cl.
CPC ............ *H01H 3/16* (2013.01); *H02G 3/0493* (2013.01); *H02G 11/02* (2013.01); *B60L 2230/12* (2013.01); *Y02T 10/7005* (2013.01); *Y02T 10/7094* (2013.01); *Y02T 90/121* (2013.01); *Y02T 90/128* (2013.01); *Y02T 90/14* (2013.01)

(58) Field of Classification Search
CPC .... H01R 24/64; H01R 43/16; H01R 13/2421; H01R 13/514; H01R 13/665; H01R 2201/12; H01R 2201/26; H01R 12/57; H01R 13/506
See application file for complete search history.

(56) References Cited

U.S. PATENT DOCUMENTS

| 5,306,999 | A | 4/1994 | Hoffman |
| 6,216,834 | B1 | 4/2001 | Steinhovden |
| 6,271,489 | B1 | 8/2001 | Engel et al. |
| 6,338,450 | B1 | 1/2002 | Schwendinger |
| 2001/0010454 | A1* | 8/2001 | Oguri ...................... H02J 7/025 320/101 |
| 2011/0074351 | A1 | 3/2011 | Bianco et al. |
| 2011/0193521 | A1 | 8/2011 | Ichikawa |
| 2012/0048983 | A1 | 3/2012 | Bianco et al. |
| 2012/0091961 | A1 | 4/2012 | Hani et al. |
| 2012/0212180 | A1* | 8/2012 | Iida ..................... B65H 75/4476 320/109 |
| 2012/0268067 | A1* | 10/2012 | Poulsen .................... H02J 5/00 320/109 |
| 2013/0320921 | A1* | 12/2013 | Muller .................. H02J 7/0042 320/109 |
| 2014/0055083 | A1* | 2/2014 | Moribe ................. H02J 7/0042 320/107 |
| 2015/0002091 | A1* | 1/2015 | Nakayama ............ H02J 7/0052 320/108 |
| 2015/0008878 | A1* | 1/2015 | Mizuno ................. H02J 7/0042 320/109 |

OTHER PUBLICATIONS

Clapper, M. "Electric Vehicles—Charging Stands & Infrastructure", Jun. 13, 2011, [retrieved on Oct. 9, 2013]. Retrieved from the Internet: <URL: http://www.geindustrial.com/publibrary/checkout/EV-Whitepaper?TNR=White%20PapersIEV-Whitepaperlgeneric> 8pp.

International Search Report and Written Opinion for PCT/US13/047299, dated Dec. 2, 2013, 19 pages.

Extended European Search Report for EP Patent Application No. 13887645.3 dated Feb. 16, 2017, 5 pages.

* cited by examiner

ELECTRIC VEHICLE CHARGING STATION LOCKING CABLE REEL

FIELD OF THE DISCLOSURE

The present disclosure relates generally to the charging of electric vehicles and, more particularly to the releasable locking of the power conductors in a cable used for the charging of electric vehicles.

BACKGROUND OF THE DISCLOSURE

An electric vehicle supply equipment (EVSE), also known as an electric vehicle charging station (EVCS), has a long cable terminated by a connector that plugs into the electric vehicle to charge its battery. This long cable has several conductors made of copper, an expensive metal. The cable is permanently attached to the charging station housing or pedestal, like a hose at a gas pump. In the United States, for example, the cable can be as long as 25 feet in length, as specified by the National Electrical Code (NEC), Article 625.

For safety reasons, the cable is disconnected from the main power supply when the connector is not connected to an electric vehicle. Thus, the exposed cable presents an apparent low risk, high-reward target for theft due to the significant copper content and lack of dangerous voltages. In addition, in geographic locations that experience a harsh or unforgiving climate, prolonged exposure of the cable to the environment can lead to dielectric breakdown, cracking of the dielectric insulation material, and other deleterious effects that can pose a safety hazard to human operators. Moreover, the long cable can become twisted or can pose a tripping hazard when it lies on the ground.

What is needed is a cable management system that overcomes these and other problems.

SUMMARY

In a conventional EVSE connector, whose connections are presently governed by the SAE J1772 Standard in North America (and Japan), (and similar IEC62196-2 in Europe) the conductors that make up the EVSE cable carry power or data (control) signals between the EVSE and an electric vehicle being charged. For so-called Level 1 and Level 2 AC EVSE chargers, there are two power conductors, called L1 and L2, a ground conductor, and two data conductors, which carry a control pilot signal or a proximity signal as defined by the J1772 Standard. According to aspects of the present disclosure, a cable management system allows the entire cable to be wound (retracted) or unwound around a reel while keeping the data connections alive all the time but allowing selective electrical connection of the power and ground conductors depending on whether the EVSE cable is connected to an electric vehicle. In addition, and without intending to describe every aspect in this summary, the cable management system can lock the cable and prevent it from being unwound from the reel until, for example, a button on the EVSE connector is depressed, which allows the cable to be retracted from the reel. Because the data connections are always maintained, the cable management system can use the data signals to control under what condition or conditions the cable is locked or unlocked relative to the reel. When the cable is not in use, it is de-energized and can be securely tucked inside a housing of the EVSE to minimize the possibility of theft and prolonged exposure to weather and sunlight.

The cable management system includes a cable reel assembly. The cable is wound around a reel, like thread on a spool. A biasing mechanism, such as a spring or a motor, can be provided to bias the reel, for example, so that it keeps the cable wound around it and the connector at the free end of the cable must be pulled away from the reel to unwind the cable from the reel. As mentioned above, the power conductor(s) L1 and optionally L2 are electrically coupled to the main power supply for the EVSE and decoupled from the main power supply using caliper assemblies. A shaft runs through the center of the reel, and discs (or drums) carrying conductive pads are attached to the shaft, with the calipers positioned like brake calipers over the pads to make or break connections with the discs. At the same time, the conductors carrying the data signals maintain a continuous electrical connection with the EVSE. To ensure this continuous data connection while allowing selective connection and disconnection of the power conductors, slip rings can be optionally secured to the shaft. The conductors carrying the data signals run through the hollow center of the shaft, and connect to corresponding slip rings, and contacts coupled to the slip rings carry the data signals to the EVSE.

The power conductors (including ground) can run along the shaft or inside the hollow center of the shaft. As the shaft rotates with the reel, the slip rings maintain a constant electrical connection with the data signals between the EVSE connector to the EVSE, but allows the calipers to be selectively activated to electrically connect and disconnect the power conductors and to prevent or to allow the reel rotation. In other words, the caliper assemblies serve at least two functions—to electrically couple the power conductors from the cable to the main power supply for the EVSE and to mechanically stop or allow rotation of the reel and thereby lock the cable in a fixed position. The cable reel assembly may also take up any slack in the cable once retracted, as only so much length of the cable needs to be unwound from the reel as is needed to reach the electric vehicle, preventing the cable from becoming twisted or a tripping hazard.

The foregoing and additional aspects of the present disclosure will be apparent to those of ordinary skill in the art in view of the detailed description of various embodiments, which is made with reference to the drawings, a brief description of which is provided next.

BRIEF DESCRIPTION OF THE DRAWINGS

Aspects of the disclosure can be understood by reference to the following description taken in conjunction with the accompanying drawings, in which.

DETAILED DESCRIPTION OF THE ILLUSTRATED EMBODIMENTS

Although the present disclosure will be described in connection with certain preferred embodiments, it will be understood that the present disclosure is not limited to those particular embodiments. On the contrary, the present disclosure is intended to cover all alternatives, modifications, and equivalent arrangements as may be included within the invention as defined by the appended claims.

Figure 1:
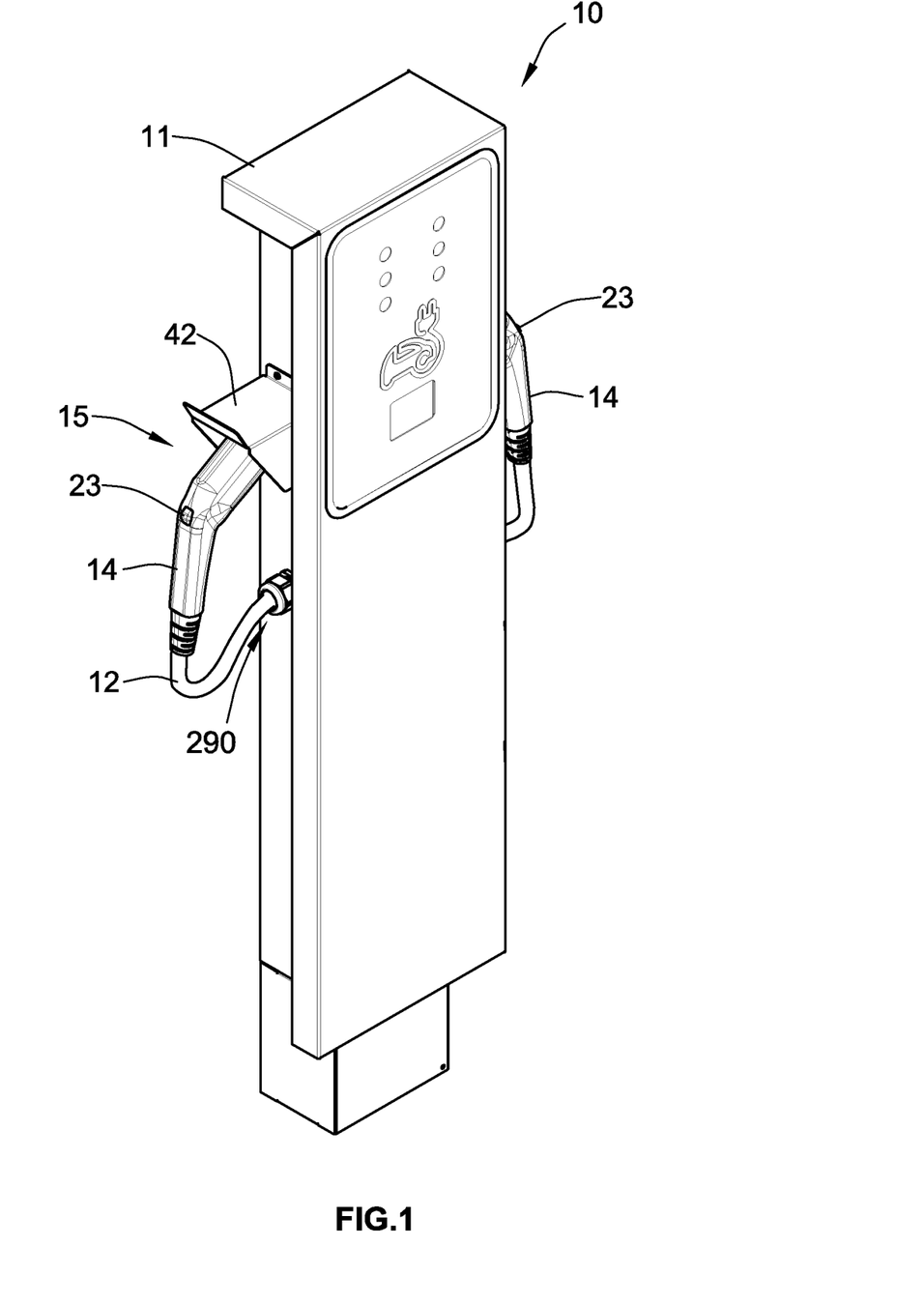
FIG. 1 is a top left perspective view of a pedestal-type charging station for electric vehicles (referred to herein as an EVSE or an EVCS), and a retractable cable protruding out of a housing of the pedestal and terminated by an electrical connector for connecting to an electric vehicle to charge its battery.

Turning now to the drawings, FIG. 1 illustrates an electric vehicle charging station (EVCS) or electric vehicle supply equipment (EVSE) 10 that includes a pedestal or housing 11 connected to an electrical power source 20 such as the local electric utility grid or a generator or a photovoltaic (PV) array, or any other source of electrical power, or any combination of the foregoing. In FIG. 1, the electrical power source 20 can refer to the connections from the EVCS 10 to the utility grid, generator, or PV array. Naturally, the utility grid, generator, or PV array itself would not be part of the EVCS 10, but rather the EVCS 10 includes conventional connections to power conductors that eventually lead to the actual source of energy (e.g., a utility grid, a generator, or a PV array). The terms EVCS and EVSE are used synonymously and interchangeably herein. The power train of an electric vehicle is primarily powered by an electric motor that draws power from a rechargeable energy storage device such as a battery, as well as exchanging information. The electric vehicle typically has an electrical receptacle for receiving an electrical connector coupled to an electrical power supply for charging one or more batteries in the vehicle. As used herein, the term "electric vehicle" includes both vehicles that use only electrical power and hybrid vehicles in which the power train uses both an electrical power source 20 and an internal combustion engine. Although a pedestal-style EVCS 10 is shown in FIG. 1, the present disclosure is not limited to any particular form factor of the EVCS.

Within the pedestal 11, the electrical power source 20 is connected to one end of a power cable 12 via conventional safety devices such as a circuit breaker or fuse. The other end of the power cable 12 is connected to an electrical connector contained within a handle 14. The EVSE connector 13 includes multiple electrical terminals adapted to engage mating electrical terminals in a conventional electrical receptacle that is standard equipment in electric vehicles. As mentioned above, the current standard for electrical connectors for charging electric vehicles in North America is the SAE J1772 standard, for both the male and female electrical terminals used to connect the battery in an electric vehicle to an EVCS to re-charge the vehicle's rechargeable battery (which can include one or more batteries, but for convenience, the vehicle's battery shall be referred to herein in the singular form). A J1772 connector includes three conductors for connecting the power carrying lines of the electrical power source 20 to the vehicle's charging electronics and to an electric vehicle ground terminal. The vehicle then receives and stores electrical power in its battery for future use by the vehicle. The power cable 12 can have a length of 25 feet or shorter, as specified by Article 625 of the National Electrical Code (NEC) in the United States, or any other length within a limit set by an applicable standards body or regulatory authority.

When the charging station 10 is not in use, the handle 14 is inserted into a docking station 15 on the pedestal 11. The docking station 15 is located at a preselected elevation on the pedestal 11 that is convenient for all users of the charging station 10. The docking station 15 does not include any electrical connectors, but provides physical support and protection for the EVSE connector 13 when it is not in use.

Figure 2:
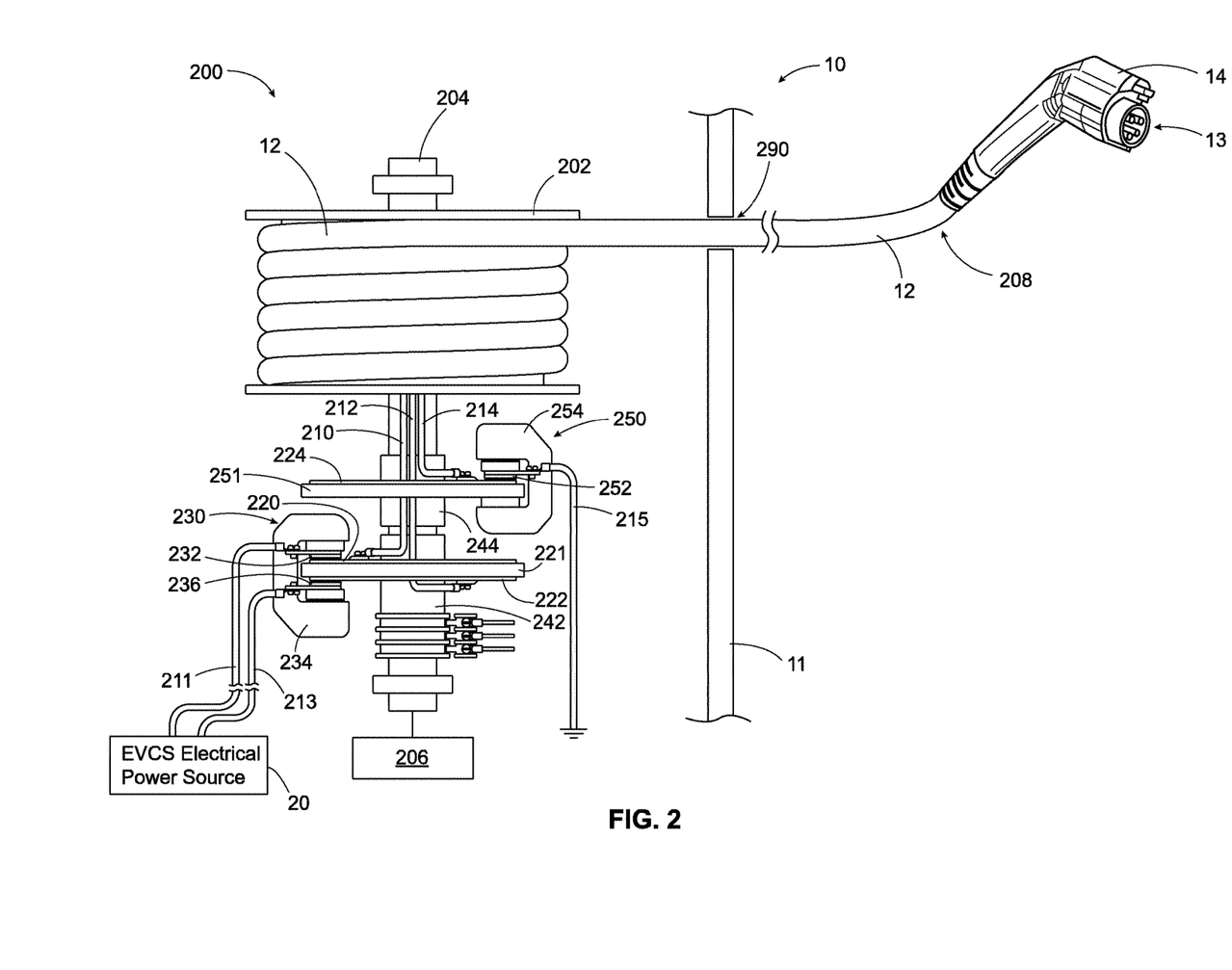
FIG. 2 is partial schematic and partial functional representation of a cable reel assembly housed within the pedestal or housing of the EVCS shown in FIG. 1.

FIG. 2 illustrates a cable reel assembly 200 housed within the pedestal 11 of the EVCS 10. The cable reel assembly includes the cable 12, which is electrically connected to an EVSE connector 13 at one end 208 of the cable 12, and a reel or a drum 202 around which the cable 12 is wound (or spooled or retracted) or unwound (or unspooled or dispensed). For convenience, the reference number 202 will be referred to herein as a reel, although it can just as equally be a drum or any other suitable structure around which an electrical cable can be wound. The reel 202 is rotatable in two opposing directions (e.g., clockwise versus anti-clockwise). The reel 202 is supported by a shaft 204 and is rotated in one direction or another by a mechanism 206, which can be any conventional mechanical or electro-mechanical mechanism suitable for rotating the reel 202 in two opposing directions. For example, the mechanism 206 can be a bidirectional motor mechanically coupled to the shaft 204, which turns the shaft 204 in one direction or another under the electric power of the motor. The mechanism 206 can include one or more springs or other biasing mechanisms, for example, to mechanically rotate the shaft 204 in one direction or its opposite. Those skilled in the art will appreciate that there are a myriad of ways of imparting rotational energy to the shaft 204 in two opposing directions, the details of which are not germane to an understanding of the present disclosure. It is important to note that the reel 202 can be rotated in two opposing directions to allow the cable 12 to be wound or spooled around the reel 202 in a first direction (e.g., clockwise) or unwound or dispensed from the reel 202 in a second direction opposite from the first direction (e.g., anti-clockwise).

Inside the cable 12 is a first conductor 210 for carrying a high supply current between the EVCS 10 and the EVSE connector 13. The first conductor 210 can be made, for example, of copper, and can have a gauge sufficient to carry SAE Level 1 (e.g., 120V at 16 A) or SAE Level 2 (e.g., 240V at 30 A or 80 A) current or any higher level of current, such as in the proposed (at the time of filing of the present disclosure) SAE Level 3 charging limits (e.g., 400 A or 240 kW). A first conductive member 220 is electrically connected to the first conductor 210 at the other end of the cable 12 inside the pedestal 11. The first conductive member 220 can be carried by a rotor 221 so that both move simultaneously with the rotation of the reel 202. By way of example, the first conductive member 220 can be an electrically conductive disc or drum, and for convenience, the first conductive member 220 may be referred to herein as a first disc 220, without intending to limit the form factor of the first conductive member 220 to a disc or drum. The first conductive member 220 can be any electrically conductive structure. The terms "electrically conductive" and "electrically conducting" are synonymous herein, referring to any structure capable of carrying electrical current. The first conductor 210 can be connected, for example, to an L1 terminal or pin 1 of the J1772 connector 13, as defined by the SAE J1772 Standard. The conductors 210, 212 are configured to carry a high current, whereas the data conductors 280, 282, 284 discussed below are configured to carry low-current data signals or ground.

The cable reel assembly 200 further includes a first caliper assembly 230 having a closed position in which a first conductive pad 232 of the first caliper assembly 230 is clamped onto the first conductive member 220, thereby electrically coupling the first conductive member 220 to the EVCS 10 (and thereby to the electrical power source 20 for the EVCS 10) and preventing the cable 12 from being unwound from the reel 202. The first conductive pad 232 is coupled to a clamp 234 of the first caliper assembly 230. The first caliper assembly 230 also has an open position in which the first conductive pad 232 is unclamped from the first conductive member 220 thereby decoupling the first conductive member 220 from the EVCS 10 (and thereby from the electrical power source 20) and freeing the cable 12 to be wound around or unwound from the reel 202. Those skilled in the art will readily appreciate that any number of techniques and structures can be used to operate the first caliper assembly 230 between its open and closed positions. For example, electrical or hydraulic or electro-hydraulic systems can be used to actuate the jaws of the first clamp 234 to clamp down upon the first rotor 220 and to be released from physical contact with the first rotor 220 and thereby break any electrical connection between the first clamp 234 and the first conductive member 220. The terms "first," "second," "third," and so forth as used herein are not intended to convey any relative importance, rank, temporal sequence, or order, but are intended merely to differentiate two like components from one another.

It is noted that when the first caliper assembly 230 is clamped onto the first conductive member 220, there can be an additional protection device, such as a relay or a contactor in the EVCS 10, which is operated in cooperation with the actuation of the first caliper assembly 230 to control the flow of current through the first conductor 210 to the cable 12. For example, after the first clamp 234 is actuated (e.g., via hydraulic pressure or electrical control) to clamp the first conductive pad 232 into physical contact with the first rotor 220, then a relay or other switch can be actuated to allow current to flow from the electrical power source 20 to the first conductor 210. Likewise, before the first clamp 234 is actuated to release the first conductive pad 232 away from physical contact with the first rotor 220, a protection device such as a contactor can be actuated to stop the current from flowing from the electrical power source 20 to the first conductive pad 232. This eliminates any voltage potential difference between the pad 232 and the rotor 220 such that as the two are brought in physical contact with one another or begin to separate from one another, the potential for arcing is eliminated. However, it is emphasized that the present disclosure does not necessarily require a protection device such as a switch or a contactor, and the electrical connections between the electrical power source 20 and the first conductor 210 can be made or broken directly through actuation of the first caliper assembly 230. An internal conductor 211 is electrically coupled directly or through a protection device to the electrical power source 20 for the EVCS 10.

What has been described thus far is a basic configuration of an aspect of the present disclosure. In this basic configuration, how the other conductors, such as ground, or the second power conductor, are connected or the data conductors, such as those carrying the low-current control pilot and proximity signals, are connected is not necessary to implement the basic configuration. The basic configuration is applicable to any apparatus in an electrical distribution system in which it is desirable or necessary that the apparatus be disconnected from the main power source while the cable 12 is being dispensed or retracted from the reel 202. What follows are additional components that can be optionally added according to different configurations as enhancements to the basic configuration just described. The present disclosure contemplates the basic configuration alone or in any combination with of any one or more of these additional optional components that will be described next.

Still referring to FIG. 2, the cable reel assembly 200 can further include a second conductive member 222 electrically connected to a second conductor 212 of the cable 12 at the other end (opposite the first end 208) of the cable 12. The second conductor 212 can be connected to an L2 terminal or pin 2 of the J1772 connector 13 as defined by the SAE J1772 Standard. This second conductor 212 can carry neutral (in the case of L1 charging) or additional current to support SAE Level 2 charging. Conveniently, the second conductive member 222, here shown as a disc, is carried by the same rotor 221 as the first conductive member 220. The first caliper assembly 230 includes a second conductive pad 236 that is clamped onto the second conductive member 222 in the closed position thereby electrically coupling the second conductive member 222 to the EVCS 10 (and eventually to the electrical power source 20) and unclamped from the second conductive member 222 in the open position thereby decoupling the second conductive member 222 from the EVCS 10 (and thereby from the electrical power source 20).

The first conductor 210 connects to an L1 terminal of the EVSE connector 13, and the second conductor 212 connects to an L2 or neutral terminal of the EVSE connector 13. The first conductive member 220 (or first disc) rotates with the shaft 204 of the reel 202 as the cable is retracted or dispensed from the reel 202. A collar or sleeve 242 (FIG. 2) attached to the shaft 204 supports the first conductive member 220 via the rotor 221 so that the first conductive member 220 rotates with the shaft 204. Likewise, the second conductive member 222 can be an electrically conductive disc (best seen in FIG. 4) or drum that encircles the shaft 204 and rotates with the shaft 204 of the reel 202 as the cable 12 is wound or unwound from the reel 202. The second conductive member 222, which is attached to the same rotor 221 as the first conductive member 220, rotates with the shaft 204 by way of the collar 242, to which the rotor 221 is attached.

The first and second conductors 210, 212 extend away from the reel 202 and along an exterior of the shaft 204 to the first and second conductive members 220, 222, respectively. In FIG. 2, the conductors 210, 212 run along the outside of the shaft 204 away from the reel 202 to the conductive members 220, 222. Although the conductors 210, 212 are shown as being external to the shaft 204, alternately, they can run down an inner hollow center or bore of the shaft 204. However, in the illustrated embodiment, the shaft 204 provides shielding for the low-current data signal conductors 280, 282, 284 (which are themselves insulated), discussed below, running inside the shaft 204 from the electromagnetic interference that can be produced by the power conductors 210, 212. By isolating the power conductors 210, 212 and running them outside the shaft 204, while running the data signal conductors 280, 282, 284 inside the shaft, the two sets of conductors can be shielded from one another. This also simplifies assembly of the cable reel assembly 200 and reduces the possibility of accidentally connecting a power conductor to a data signal terminal or vice versa.

The cable reel assembly 200 can further include a third conductive member 224 electrically connected to a third conductor 214 at the other end of the cable 12. Like the first and second conductors 210, 212, the third conductor 214 can run along an exterior of the shaft 204 away from the reel 202 to the third conductive member 224, which can also be an electrically conductive disc (best seen in FIG. 4). When the conductive members 220, 222, 224 are circular, hole-bearing discs, these conveniently include a central hole through which the conductors 210, 212, 214 can run without getting twisted around the shaft 204 as the reel 202 rotates. To support the third conductive member 224, the cable reel assembly 200 includes a second caliper assembly 250 having a closed position in which a third conductive pad 252 that is clamped onto the third conductive member 224 thereby electrically coupling the third conductive member 224 to the EVCS 10 (and thereby to the electrical power source 20) and preventing the cable 12 from being unwound from the reel 202. The second caliper assembly 250, like the first caliper assembly 230, also has an open position in which the third conductive pad 252 is unclamped from the third conductive member 224 by a second clamp 254 thereby decoupling the third conductive member 224 from the EVCS 10 (and thereby to the electrical power source 20). The third conductive member 224 can be carried by a second rotor 251, like the rotor 221 carries the first and second conductive members 220, 222. The second rotor 251 can be attached to or integrated with a collar or sleeve 244 that is attached to the shaft 204 and rotates with the shaft 204. The collars 242, 244 also operate to maintain the disc 224, which can be connected to a ground potential, a fixed distance away from the discs 220, 222, which can be energized, thereby reducing the risk of an internal ground fault connection inside the EVCS 10, even in the case of a mechanical failure of the caliper assemblies 230, 250, the discs 220, 222, 224, or the rotors 221, 251.

In this example, the third conductor 214 connects to a ground terminal of the EVSE connector 13 through the cable 12. The third conductive pad 252 is connected inside the housing 11 to a ground conductor 215 that is connected to a ground potential. In the illustrated aspects, the pads 232, 236, 252 are electrically conductive, and these pads make the initial physical contact with the corresponding discs 220, 222, 224; however, as discussed below, these pads can also be made of a non-electrically conductive material such that the initial physical contact between the pads and the discs 220, 222, 224 is non-conducting. Then, after the initial physical contact is made, the pads 232, 236, 252 have an electrically conductive portion or pad that makes the electrical connection between the discs 220, 222, 224 and the power conductors 210, 212, 214.

Having a separate caliper assembly for the ground connection allows selective actuation of the ground-carrying conductor versus the current-carrying power conductors. For example, while the first caliper assembly 230 remains disconnected (i.e., the first and second conductive members 220, 222 are not physically contacting the first and second pads 232, 236), the second caliper assembly 250 can be activated to stop the reel 202 from moving, thereby mechanically arresting the cable 12 from being retracted or dispensed from the EVCS 10 without connecting the L1 and L2 terminals of the EVCS connector 13 to the EVCS 10 and thereby avoiding any line voltages being exposed at the connector 13. If the EVCS 10 includes a contactor or other protection device, the connection and disconnection of the power conductors relative to the electrical power source 20 can be timed and coordinated with the actuation of the contactor. For example, mechanical stoppage of the reel 202 can occur before the contactor switch is closed to allow current flow to the cable 12, and then the ground connection can be established first, followed by the power connections, or vice versa. Alternately, a contactor can be used to make or break the electrical connections between the power conductors 210, 212 and the electrical power source 20, whereas the caliper assemblies 230, 250 are used for mechanical braking or locking and releasing of the reel 202. The caliper assemblies 230, 250 also operate to establish an electrical continuity from the power conductors 210, 212 in the cable 12 to the conductors 211, 213 that lead to the contactor of the EVCS 10. In all cases, mechanical lockage of the reel 202 can be required before any electrical connection is established between the EVCS connector 13 and the electrical power source 20 for the EVCS 10. Instead of, or in addition to, having a separate caliper assembly 250 for the ground connection, a slip ring and rotating contact can be used instead to maintain a constant ground connection, such that the ground terminal of the connector 13 always has a ground connection (regardless of the open or closed state of the first caliper assembly 230) to allow the proximity and control pilot signals to be used when current is not flowing through the power conductors 210, 212.

Of course, the L1/L2 current, neutral and ground connections are merely exemplary, and those skilled in the art will readily appreciate that the first, second, and third conductors 210, 212, 214 can carry any combination of L1/L2 current, neutral, and ground instead of the specific examples described. For example, the first conductor 210 can be connected to ground instead of to the L1 terminal of the EVSE connector 13. Fewer or additional power conductors are contemplated depending on the application. The EVSE application is just one exemplary application disclosed herein, but the present disclosure is not limited to EVSE applications.

Having described some implementations of the power conductors 210, 212, 214, attention will now be drawn to the data signals. "Data signals" in this context refer to the control pilot and proximity detection signals, as well as the ground signal that is specified in the SAE J1772 Standard and similar standards or specifications for charging electric vehicles. As is known, the proximity detection signal is used to ensure that the electric vehicle cannot be driven away while the cable 12 is attached. The control pilot signal is used to adjust a charge rate of the battery in the electric vehicle. Additional data signals are also contemplated, whether they are part of the SAE J1772 Standard or not, as the present disclosure is not limited to the described data signals. It is well anticipated and contemplated that over time additional power conductors and data signals may be added to an electric vehicle charging connector, and such additional power conductors and data signals can readily be accommodated by the cable reel assembly 200 disclosed herein. Likewise, not all of the data signals need to be used. For example, the proximity detection signal can be eliminated, and there are many other ways readily within the ordinary knowledge of the skilled person of connecting the EVCS connector 13 to ground that does not use a slip ring. The slip rings allow constant and continuous electrical connections for the data signals whereas the caliper assemblies 230, 250 allow selective connection and disconnection of the power-carrying conductors from the electrical power source 20 for the EVCS 10.

Figure 3:
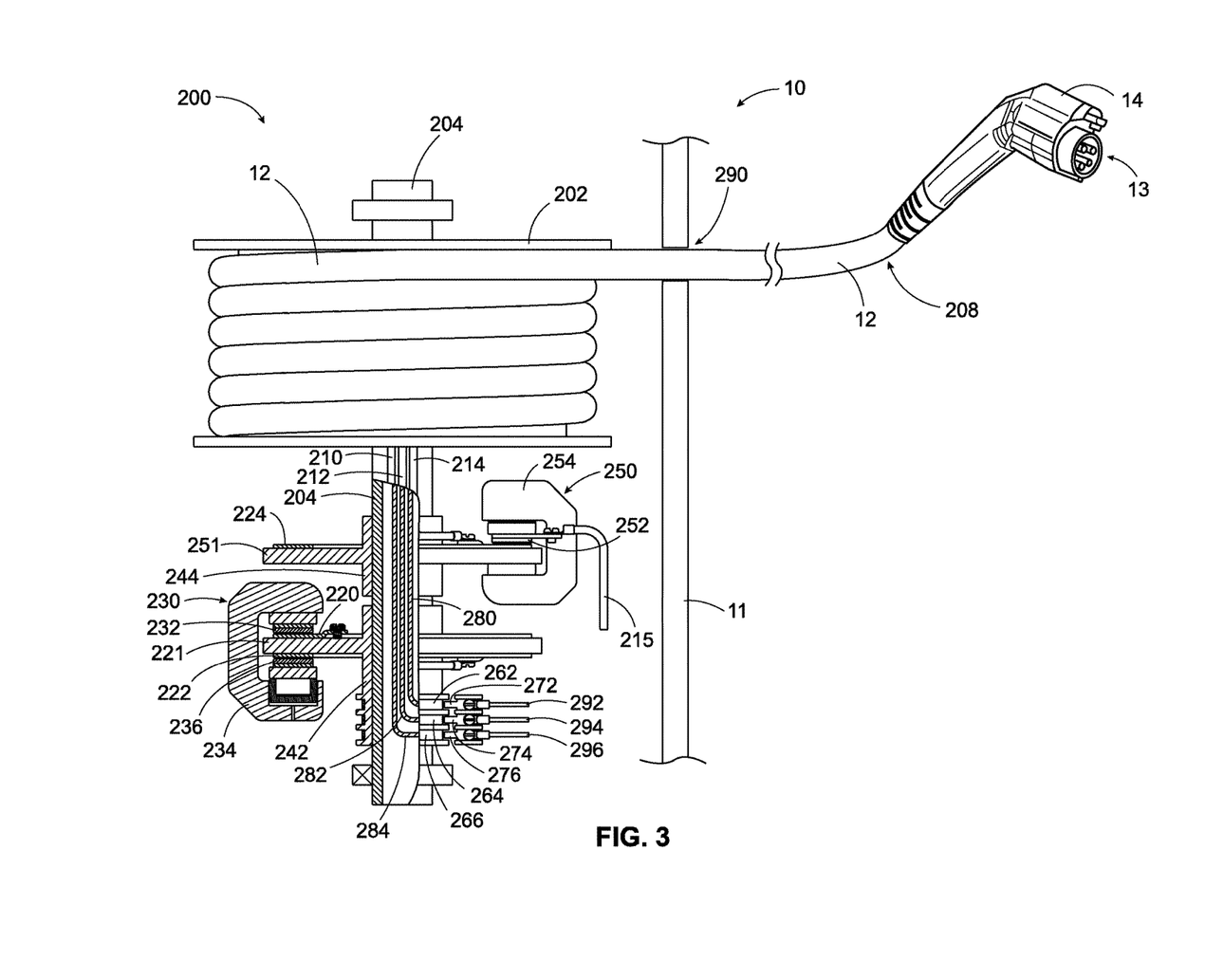
FIG. 3 is a partial cutaway view of a lower portion of the cable reel assembly shown in FIG. 2 to reveal internal conductors that run along a shaft of the reel toward slip ring connections for connection to data signals within the EVCS.

As can be seen in FIG. 3, the cable reel assembly 200 can include a first slip ring 262 that encircles and rotates with a hollow shaft 204 of the reel 202. The slip ring 262 rotates with the shaft 204 and maintains a constant and continuous electrical (and physical) contact with a first conductive contact 272, which abuts against the first slip ring 262. The first conductive contact 272 is electrically connected to a first signal conductor 280 that extends inside the hollow shaft 204 of the reel 202 to the cable 12. In this example, the first signal conductor 280 connects to a control pilot terminal or a proximity terminal or a ground terminal of the EVSE connector 13. The first signal conductor 280 is electrically coupled to the first conductive contact 272 via the first slip ring 262 regardless of (i.e., independent from) whether the first caliper assembly 230 is in the closed position or in the open position.

The cable reel assembly 200 can include a second slip ring 264 that encircles and rotates with the hollow shaft 204 and a second conductive contact 274, which abuts the second slip ring 264 and is electrically connected to a second signal conductor 282 that extends inside the hollow shaft 204 with the first signal conductor 280 to the cable 12. The second signal conductor 282 connects to another of the control pilot terminal or the proximity terminal or the ground terminal of the EVSE connector 13 (e.g., a terminal different from the terminal to which the first signal conductor 280 is connected). The second signal conductor 282 is electrically coupled to the second conductive contact 274 via the second slip ring 264 regardless of whether the first caliper assembly 230 is in the closed position or in the open position.

The cable reel assembly 200 can further include a third slip ring 266 that encircles and rotates with the hollow shaft 204 and a third conductive contact 276, which abuts the third slip ring 266 and is electrically connected to a third signal conductor 284 that extends inside the hollow shaft 204 with the first and second signal conductors 280, 282 to the cable 12. The third signal conductor 284 connects to the last of the control pilot terminal or the proximity terminal or the ground terminal of the EVSE connector 13 (i.e., whichever remaining terminal that is not connected to either the first or second signal conductors 280, 282) regardless of whether the first caliper assembly 230 is in the closed position or in the open position. When one of the signal conductors 280, 282, 284 is connected to a ground potential, that signal conductor can be connected to the ground power conductor 214 inside the cable 12. The J1772 connector 13 has five terminals, but six conductors are shown in FIG. 2, two of which can be ground. Note that one ground conductor can be used in an alternate aspect. However, when two conductors are used for ground (one always connected to ground, while the other one is selectively connectable to ground), the internal connection to the ground terminal in the connector 13 can be made within the cable 12 (not shown). Those skilled in the art will readily appreciate that there are many ways to connect the two ground conductors to one another, and such details are not pertinent to an understanding of the concepts disclosed herein.

The first, second, and third conductive contacts 272, 274, 276 are connected, such as by electrical terminal blocks or any other suitable connector, to corresponding data conductors 292, 294, 296, one, some, or all of which are connected to control electronics (not shown) of the EVCS 10 for processing the control pilot and/or proximity signals.

As can be seen in FIG. 1, the housing 11 of the EVCS pedestal encloses the entire cable reel assembly 200, including the first and second caliper assemblies 230, 250, and a majority of the cable 12 when it is fully wound around the reel 202. The cable 12 passes through an opening 290 in the housing 11 as the cable 12 is retracted into the housing 11 or dispensed from the housing 11. Although the cable reel assembly 200 is shown generally inside the housing 11, a further enclosure within the housing 11 can enclose part or all of the cable reel assembly 200 within the EVCS 10. The main point here is that the cable reel assembly 200 is housed somewhere inside the confines of the housing 11 of the EVCS 10. Only the cable 12 protrudes through the opening 290 of the housing 11 to an area outside of the housing 11. Thus, while the cable 12 is not in use, most of the cable 12 is securely retained inside the housing 11, and when the cable 12 is in use (i.e., connected to an electric vehicle to charge its battery), only so much of the cable 12 as is needed between the EVCS 10 and the electric vehicle is dispensed outside the housing 11 while the remainder of the cable 12 can be wrapped around the reel 202 of the cable reel assembly 200.

Figure 4:
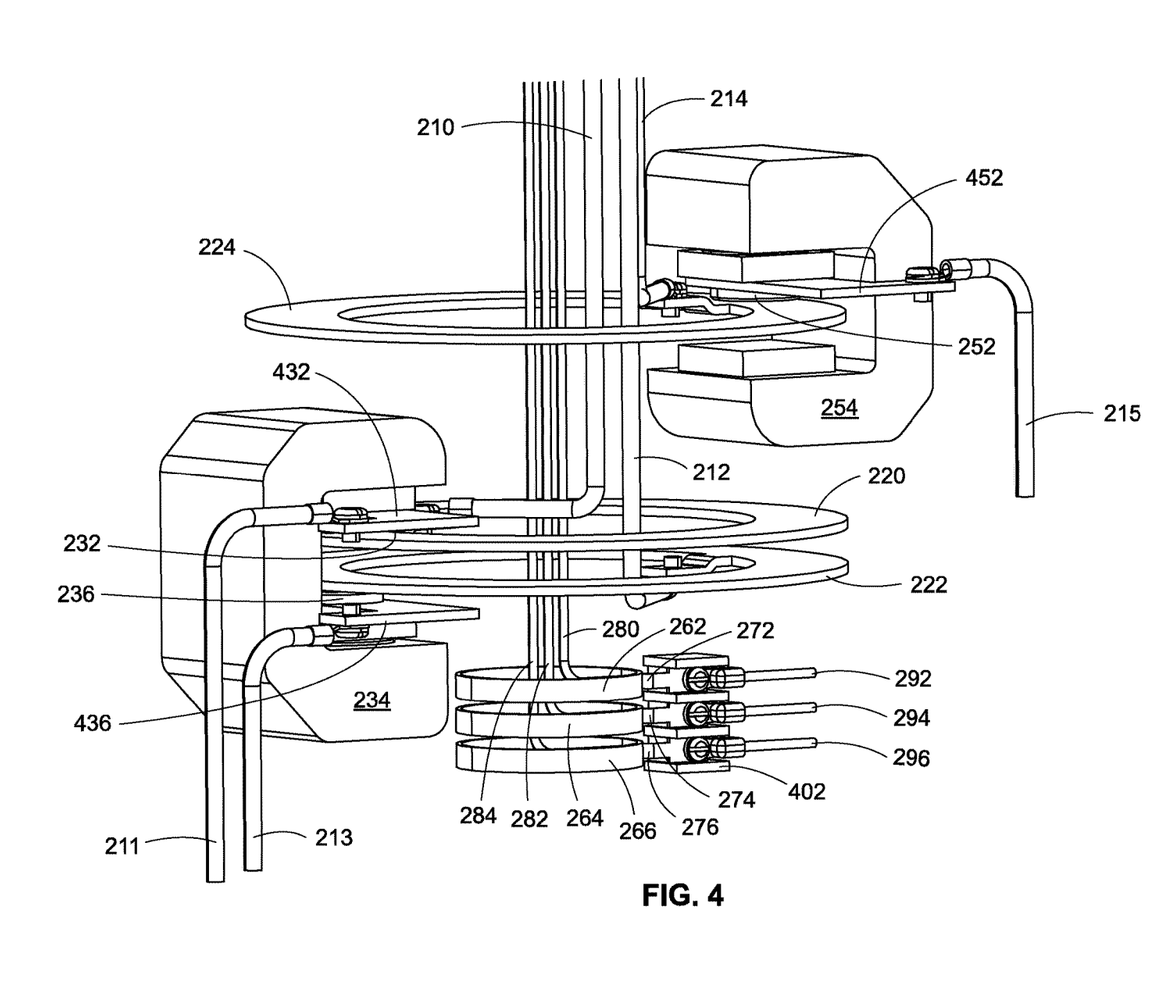
FIG. 4 is a disembodied isometric view of the electrical and mechanical structures involved in carrying out an aspect of the present disclosure, in which other structures have been eliminated for ease of illustration and discussion.

FIG. 4 illustrates part of a disembodied cable reel assembly 200 shown in FIGS. 2-3, in which the housing 11, the reel 202, the shaft 204, the rotors 221, 251, the collars 242, 244, and other structures have been removed for ease of illustration to reveal the electrical connections from the conductors to the mechanical elements involved in the cable reel assembly 200. The first clamp 234 is shown in which the conductor 211 (which is coupled to the electrical power source 20 for the EVCS 10) is connected to the pad 232 by a flat terminal 432. The conductor 213 is connected to the pad 236 by a flat terminal 436. Likewise, the conductor 215 (e.g., connected to a ground potential) is connected to the pad 252 of the second clamp 254 by a flat terminal 452. The flat terminals 432, 452 extend away from the clamps 234, 254 to accommodate the bending radius of the internal conductors 211, 213, 215 and to simplify the connection during assembly of the cable reel assembly 200 of the conductors 211, 213, 215 to the corresponding terminals 432, 436, 452.

Those skilled in the art will appreciate that any number of structures can be provided between the corresponding open jaws of the clamps 234, 252. The examples shown in the illustrations are just one of many ways of protecting the clamps 234, 254 and discs 220, 222, 224 from abrasion or warping as they endure repeated friction contact over time. Any of the structures of the clamps 234, 254 that make physical contact with the respective discs 220, 222, 224, can be made of any electrically conductive or non-electrically conductive material, and because the clamps 234, 254 in these illustrations have a jaw that can carry two electrical conductors per clamp, up to four different electrical conductors can be brought to up to four discs for mechanical stoppage. Those skilled in the art will readily appreciate that a single clamp can be used instead, having multiple jaws that move simultaneously with one another, to support more than two electrical conductors. In the context of EVCS applications, it is convenient and can be desirable to actuate the ground connection separately from the L1/L2 or neutral connections, so this is why a separate clamp 254 is shown for the ground connection. However, it is emphasized that a separate clamp need not be used; rather a single clamp with multiple jaws that move simultaneously can be used instead. Each of the multiple jaws can connect up to two conductors to the discs.

Although the illustrations herein have shown a cable reel assembly for use in connection with an EVCS, the present disclosure is not so limited. Rather, the cable reel assemblies disclosed herein can be used in any electrical distribution system in which it is desirable to have a retractable cable in which power is unavailable during cable retraction or dispensation and which mechanically prevents the cable retraction or dispensation to allow electrical current to flow through the cable to a load. A feature of the cable reel assemblies disclosed herein is that no current flows through the power conductors in the cable when the cable is being retracted or dispensed from its housing. According to an aspect, mechanical stoppage of the reel is the minimum that is required to allow current flow through the power conductors in the cable. The cable can be stopped at any arbitrary position to allow any length of the cable to be dispensed from the housing. Moreover, the cable can be rotated around a reel in two opposing directions, and can be stopped in either direction at any position. Alternately or additionally, a control signal can be required, such as via a human-machine interface on a connector attached to the cable, to allow current flow following mechanical stoppage of the reel. Another optional feature is that other conductors, such as those carrying data/control signals, can always be energized even as the cable is being retracted or dispensed from the housing of the cable reel assembly.

The proximity signal from the connector 13 can be used to control the release or braking of the reel 202 from the caliper assemblies 230, 250. Because the proximity signal from the connector 13 is always readable by the control electronics of the EVCS 10, this signal can be used by the control electronics to release the caliper assemblies 230, 250 upon detection of a proximity signal via a button 23 on the handle 14. When charging of the electric vehicle is complete, and the connector 13 is released from the corresponding charging receptacle in the electric vehicle, the control electronics can release the caliper assemblies 230, 250 to allow the mechanism 206 to cause the shaft 204 to rotate the reel 202 in a direction that retracts or spools the cable 12 around the reel 202.

Instead of using caliper clamps to brake or lock the reel mechanically and to disconnect the power conductors from the reel, alternately, a drum system can be used. A mechanical braking or locking is achieved by pressing a shoe against a rotating drum, which also connects the power conductors to the drum or creates an electric pathway between the cable and the drum (such as in the case where a contactor is activated to allow current flow).

According to another implementation, a "two-stage" break or contact pad is provided, which has a non-electrically conductive (e.g., dielectric) pad, which first makes physical contact with the disc or wheel to provide mechanical braking or locking thereof, and subsequently an electrically conductive pad makes contact with the disc or wheel to allow electrical current to flow to the power conductors in the cable. The dielectric pad can be made of a material that offers good friction contact with the disc, such as ceramic, expanding the possibilities beyond electrically conductive materials, and minimizing or eliminating the opportunity for contact welding at the friction interfaces between the discs or drums and the pads connected to the power conductors 210, 212. The connection strength of the caliper assemblies 230, 250 can be designed to be greater than a short circuit magnetic force to avoid a blow open of the jaws of the caliper assemblies 230, 250 in implementations where the pads 232, 236, 252 are electrically conductive and make direct friction contact with the discs 220, 222, 224.

As mentioned above, a separate contactor in the EVCS 10 can be used to make or break the electrical connections between the power conductors connected to the electrical power source 20 and the connector 13 of the cable 12. However, the cable reel assembly 200 can function as a "rotating contactor" that makes the physical and electrical connections from the electrical power source 20 to the power conductors 210, 212 of the cable 12. The cable reel assemblies shown and described herein avoid exposing line voltages at the connector 13 end of the cable 12 until the connector 13 is plugged into a corresponding electrical receptacle of an electric vehicle whereupon charging of the electric vehicle's battery is allowed to proceed under the control of the EVCS 10.

Although no particular orientation is necessary to the aspects disclosed herein, the cable reel assembly 200 shown in FIGS. 1 and 2 can be oriented relative to earth such that the portion of the housing 11 shown is vertical (relative to earth), and the horizontally mounted reel 202 allows the cable 12 to be retracted or dispensed out of the housing 11 along a horizontal direction relative to earth. Thus, the portion of the housing 11 shown in FIGS. 2 and 3 refer to a vertical (relative to earth) wall of the housing 11 shown in FIG. 1. Or, the cable reel assembly 200 can be oriented in other directions, such as rotated by 90 degrees clockwise or anti-clockwise relative to its position shown in FIG. 2.

While particular embodiments and applications of the present disclosure have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A cable reel assembly of an EVSE, comprising:
   a cable electrically connected to an EVSE connector at one end of the cable, the cable including a first conductor for carrying supply current between the EVSE and the connector;
   a reel around which the cable is wound or unwound;
   a first conductive member electrically connected to the first conductor at the other end of the cable; and
   a first caliper assembly having a closed position in which a first conductive pad of the first caliber assembly is clamped onto the first conductive member thereby electrically coupling the first conductive member to the EVSE and preventing the cable from being unwound from the reel, and an open position in which the first conductive pad is unclamped from the first conductive member thereby decoupling the first conductive member from the EVSE and freeing the cable to be wound around or unwound from the reel.

2. The cable reel assembly of claim 1, further comprising:
   a second conductive member electrically connected to a second conductor of the cable at the other end of the cable; and
   the first caliper assembly including a second conductive pad that is clamped onto the second conductive member in the closed position thereby electrically coupling the second conductive member to the EVSE and unclamped from the second conductive member in the open position thereby decoupling the second conductive member from the EVSE.

3. The cable reel assembly of claim 2, wherein the first conductor connects to an L1 terminal of the EVSE connector and the second conductor connects to an L2 terminal of the EVSE connector.

4. The cable reel assembly of claim 2, in which the first conductive member is an electrically conductive disc that rotates with a shaft of the reel as the cable is wound around or unwound from the reel.

5. The cable reel assembly of claim 4, in which the second conductive member is an electrically conductive disc that encircles the shaft and rotates with the shaft of the reel as the cable is wound or unwound from the reel.

6. The cable reel assembly of claim 5, in which the first and second conductors extend away from the reel and along an exterior of the shaft to the first and second conductive members, respectively.

7. The cable reel assembly of claim 1, further comprising:
a third conductive member electrically connected to a third conductor at the other end of the cable; and
a second caliper assembly having a closed position in which a third conductive pad that is clamped onto the third conductive member thereby electrically coupling the third conductive member to the EVSE and preventing the cable from being unwound from the reel, and an open position in which the third conductive pad is unclamped from the third conductive member thereby decoupling the third conductive member from the EVSE.

8. The cable reel assembly of claim 7, wherein the third conductor connects to a ground terminal of the EVSE connector through the cable.

9. The cable reel assembly of claim 1, wherein the first conductor is connected to a ground potential.

10. The cable reel assembly of claim 1, in which the reel is rotatable in two opposing directions to permit the cable from being wound around the reel in one direction or unwound from the reel in the opposite direction.

11. The cable reel assembly of claim 1, further comprising a first slip ring that encircles and rotates with a hollow shaft of the reel.

12. The cable reel assembly of claim 11, further comprising a first conductive contact abutting the first slip ring and electrically connected to a first signal conductor that extends inside the hollow shaft of the reel to the cable, the first signal conductor connecting to a control pilot terminal or a proximity terminal or a ground terminal of the EVSE connector, wherein the first signal conductor is electrically coupled to the first conductive contact via the first slip ring regardless of whether the first caliper assembly is in the closed position or in the open position.

13. The cable reel assembly of claim 12, further comprising a second slip ring that encircles and rotates with the hollow shaft, a second conductive contact abutting the second slip ring and electrically connected to a second signal conductor that extends inside the hollow shaft with the first signal conductor to the cable, the second signal conductor connecting to another of the control pilot terminal or the proximity terminal or the ground terminal of the EVSE connector, wherein the second signal conductor is electrically coupled to the second conductive contact via the second slip ring regardless of whether the first caliper assembly is in the closed position or in the open position.

14. The cable reel assembly of claim 13, further comprising a third slip ring that encircles and rotates with the hollow shaft, a third conductive contact abutting the third slip ring and electrically connected to a third signal conductor that extends inside the hollow shaft with the first and second signal conductors to the cable, the third signal conductor connecting to the last of the control pilot terminal or the proximity terminal or the ground terminal of the EVSE connector regardless of whether the first caliper assembly is in the closed position or in the open position.

15. The cable reel assembly of claim 1, further comprising a housing that encloses the cable reel assembly, the first caliper assembly, and a majority of the cable when it is fully wound around the reel, the housing including an opening through which the cable is retracted into the housing or extracted from the housing.

16. A cable reel assembly of an EVSE, comprising:
a cable electrically connected to an EVSE connector at one end of the cable, the cable including a first conductor for carrying supply current between the EVSE and the connector;
a reel around which the cable is wound or unwound;
a hollow shaft connected to the reel;
a first conductive member electrically connected to the first conductor at the other end of the cable;
a first caliper assembly having a closed position in which a first conductive pad of the first caliper assembly is clamped onto the first conductive member thereby electrically coupling the first conductive member to the EVSE and preventing the cable from being unwound from the reel, and an open position in which the first conductive pad is unclamped from the first conductive member thereby decoupling the first conductive member from the EVSE and freeing the cable to be wound around or unwound from the reel;
a first slip ring that encircles and rotates with the hollow shaft; and
a first conductive contact abutting the first slip ring and electrically connected to a first signal conductor that extends inside the hollow shaft of the reel to the cable, the first signal conductor connecting to a control pilot terminal or a proximity terminal or a ground terminal of the EVSE connector.

17. The cable reel assembly of claim 1, in which the first conductive member is an electrically conductive disc that rotates with a shaft of the reel as the cable is wound around or unwound from the reel.

\* \* \* \* \*